(12) United States Patent
Reischmann

(10) Patent No.: US 9,199,284 B1
(45) Date of Patent: Dec. 1, 2015

(54) PORTABLE WHEEL CLEANING SYSTEM

(76) Inventor: Michael J. Reischmann, Eustis, FL (US)

( * ) Notice: Subject to any disclaimer, the term of this patent is extended or adjusted under 35 U.S.C. 154(b) by 512 days.

(21) Appl. No.: 13/603,900

(22) Filed: Sep. 5, 2012

(51) Int. Cl.
*B08B 3/02* (2006.01)

(52) U.S. Cl.
CPC ........................................ *B08B 3/024* (2013.01)

(58) Field of Classification Search
CPC ........................................................ B08B 3/024
See application file for complete search history.

(56) References Cited

U.S. PATENT DOCUMENTS

| | | | | |
|---|---|---|---|---|
| 3,856,028 A | * | 12/1974 | Kehler | A01D 34/003 134/198 |
| 4,985,957 A | * | 1/1991 | Belanger | B60S 3/042 134/123 |
| 5,052,629 A | * | 10/1991 | Belanger | B60S 3/042 134/123 |

* cited by examiner

*Primary Examiner* — Jason Ko

(57) ABSTRACT

A housing has interior and exterior ends with a side wall there between. A spray assembly includes a manifold. The manifold is mounted for rotational movement within the housing. A tube extends through the exterior end. In this manner the manifold is coupled to a source of water. A plurality of spray nozzles is provided. The spray nozzles are provided on the manifold. The spray nozzles are angled in opposite directions. In this manner pressurized water may pass through the tube. Also in this manner water passing through the tube will spin the nozzles. Further in this manner the water coming into contact with a wheel there adjacent will be discharged.

7 Claims, 3 Drawing Sheets

PORTABLE WHEEL CLEANING SYSTEM

BACKGROUND OF THE INVENTION

Field of the Invention

The present invention relates to a portable wheel cleaning system and more particularly pertains to spraying pressurized water onto a wheel to be cleaned with fixed or rotating nozzles under a containment dome in order to remove dirt and debris from the wheel, the spraying and cleaning being done in a safe, convenient and economical manner.

SUMMARY OF THE INVENTION

In view of the disadvantages inherent in the known types of cleaning systems of known designs and configurations now present in the prior art, the present invention provides an improved wheel cleaning system. As such, the general purpose of the present invention, which will be described subsequently in greater detail, is to provide a new and improved wheel cleaning system and method which has all the advantages of the prior art and none of the disadvantages.

To attain this, the present invention essentially comprises a wheel cleaning system. A housing has interior and exterior ends with a side wall there between. A spray assembly includes a manifold. The manifold is mounted fixed or for rotational movement within the housing. A tube extends through the exterior end. In this manner the manifold is coupled to a source of water. A plurality of spray nozzles is provided. The spray nozzles are provided on the manifold. The spray nozzles are angled in opposite directions. In this manner pressurized water may pass through the tube. Also in this manner water passing through the tube will spin the nozzles. Further in this manner the water coming into contact with a wheel there adjacent will be discharged.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheel cleaning system which has all of the advantages of the prior art cleaning systems of known designs and configurations and none of the disadvantages.

It is another object of the present invention to provide a new and improved wheel cleaning system which may be easily and efficiently manufactured and marketed.

It is further object of the present invention to provide a new and improved wheel cleaning system which is of durable and reliable constructions.

An even further object of the present invention is to provide a new and improved wheel cleaning system which is susceptible of a low cost of manufacture with regard to both materials and labor, and which accordingly is then susceptible of low prices of sale to the consuming public, thereby making such wheel cleaning system economically available to the buying public.

Lastly, it is an object of the present invention is to provide a wheel cleaning system for spraying pressurized water onto a wheel to be cleaned and for rotating the sprayed pressurized water in order to remove dirt and debris from the sprayed wheel, the spraying and rotating and removing being done in a safe, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figures 1, 2:
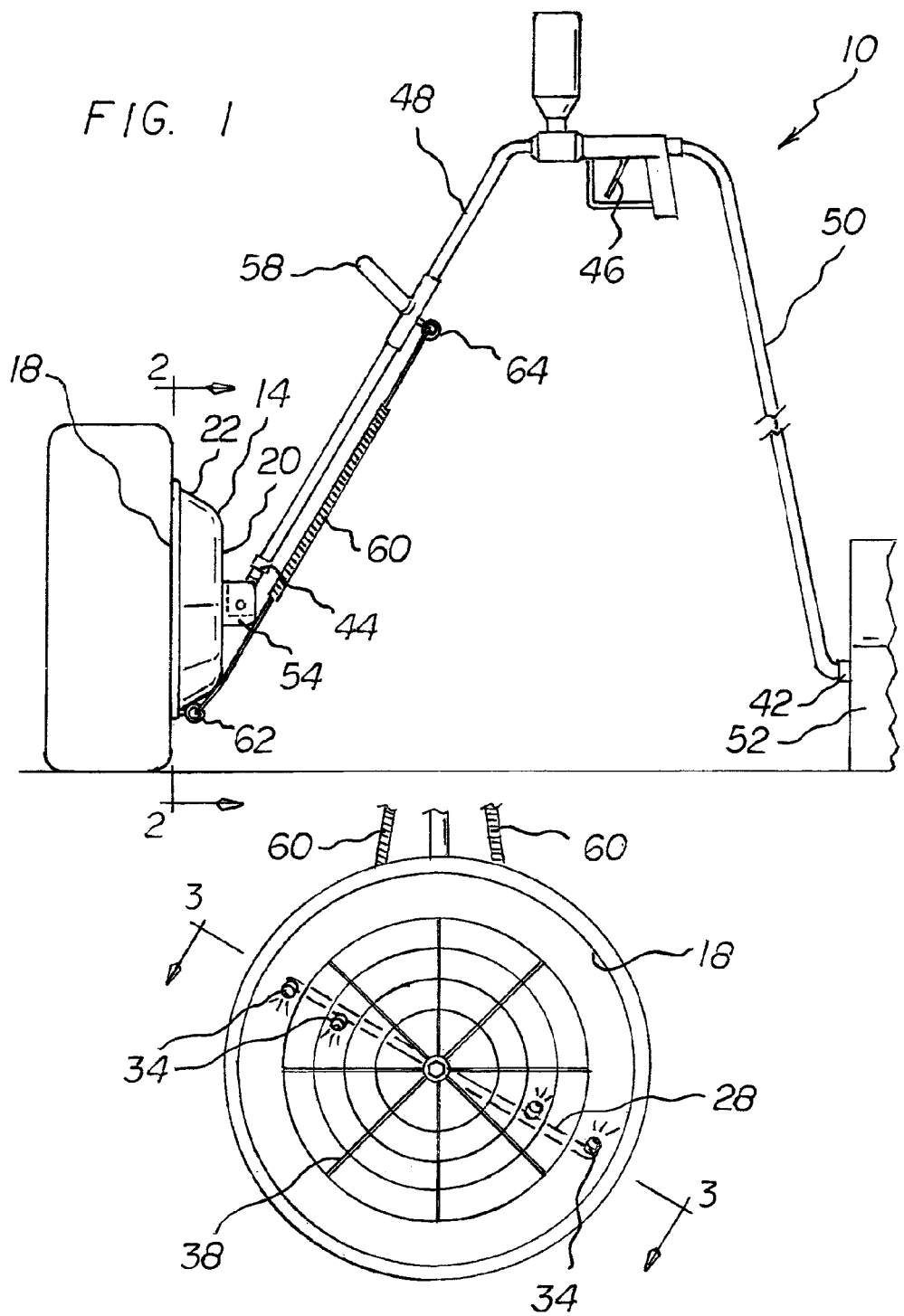
FIG. 1 is a side elevational view of a portable wheel cleaning system constructed in accordance with the principles of the present invention.
FIG. 2 is a cross sectional view taken along line 2-2 of FIG. 1.
Figure 3:
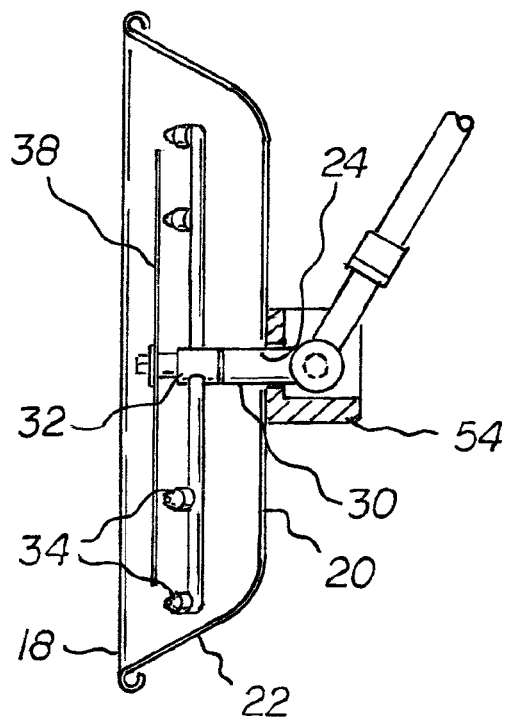
FIG. 3 is a cross sectional view taken along line 3-3 of FIG. 2.

With reference now to the drawings, and in particular to FIG. 1 thereof, the preferred embodiment of the new and improved portable wheel cleaning system embodying the principles and concepts of the present invention and generally designated by the reference numeral 10 will be described.

The present invention, the portable wheel cleaning system 10 is comprised of a plurality of components. Such components in their broadest context include a housing, and a spray assembly. Such components are individually configured and correlated with respect to each other so as to attain the desired objective.

First provided is a housing 14, a water containment dome. The housing has a circular interior end 18. The interior end has a first diameter. The housing has a circular exterior end 20. The exterior end has a second diameter. The second diameter is from 60 percent to 80 percent of the first diameter. The housing has a frusto-conical side wall 22. The side wall is provided between the interior end and exterior end. A normally horizontal central axis extends centrally through the interior end and the exterior end and the side wall. The interior end and the exterior end are provided in parallel planes perpendicular with the central axis. The side wall forms an angle of between 20 degrees and 40 degrees with respect to the central axis. The interior end is open. The side wall is imperforate. The interior end is formed as an extension of the side wall. The interior end has central aperture 24. The housing is fabricated of a rigid metallic material.

A spray assembly 28 is provided. The spray assembly includes a manifold. The manifold is positioned within the housing. The manifold, in the preferred embodiment of the invention, is mounted for rotational movement about a plane parallel with, and intermediate of, the interior end and exterior end. The manifold is provided linear. The manifold has a length. The length of the manifold is less than the first diameter. The length of the manifold is greater than the second diameter. A fixed tube 30 is provided. The fixed tube extends through the central aperture. The fixed tube has an exterior end. The exterior end is provided exterior of the housing. The fixed tube has an interior end. The interior end is provided within the housing. A rotatable tube 32 is provided. The rotatable tube couples the fixed tube and a central extent of the manifold. The rotatable tube is rotatable with respect to the interior end of the fixed tube. A plurality of spray nozzles 34 is provided. The spray nozzles are provided on the manifold on opposite sides of the rotatable tube. The spray nozzles are provided on a first side of the rotatable tube. The spray nozzles are angled in a first direction. The spray nozzles are provided on a second side of the rotatable tube. The spray nozzles are angled in a second direction. In this manner pressurized water passing through the fixed tube and rotatable tube and manifold and nozzles will spin the nozzles. Further in this manner the pressurized water will be discharged through the interior end into contact with a wheel there adjacent.

The manifold, in an alternate embodiment of the invention, is fixedly mounted within the housing to preclude rotational movement.

A circular screen 38 is provided next. The circular screen has a center. The center is attached to the rotatable tube. In this manner the center may rotate with the rotatable tube during operation and use. The screen has a plurality of wire rings. Wire radii are provided. The wire radii couple the rings. The screen is adapted to preclude damaging contact between the rotating nozzles and the wheel there adjacent being cleaned.

Further provided is a water supply assembly. The water supply assembly has an input end 42. The input end is adapted to be coupled to a source of water. The water supply assembly has an output end 44. The output end is attached to the fixed tube. A handle with a trigger 46 is provided. The handle is provided on an intermediate region of the water supply assembly. The trigger is adapted to be pulled. In this manner water may flow from the source to and through the nozzles and to exterior of the housing. The water supply assembly has a rigid segment 48. The rigid segment is provided downstream of the trigger. The water supply assembly has a flexible segment 50. The flexible segment is provided upstream of the trigger. A supply 52 of a cleaning fluid is provided. The cleaning fluid is provided in the rigid segment adjacent the trigger. A bracket 54 is provided. The bracket is fixedly secured to the housing adjacent to the fixed tube. The bracket is pivotally secured to the fixed segment. In this manner the fixed tube is movable between first orientation and a second orientation. In the first orientation, the fixed tube is provided co-axial with the fixed tube and a second orientation perpendicular to the fixed tube and any intermediate angular orientation there between.

Figure 4:
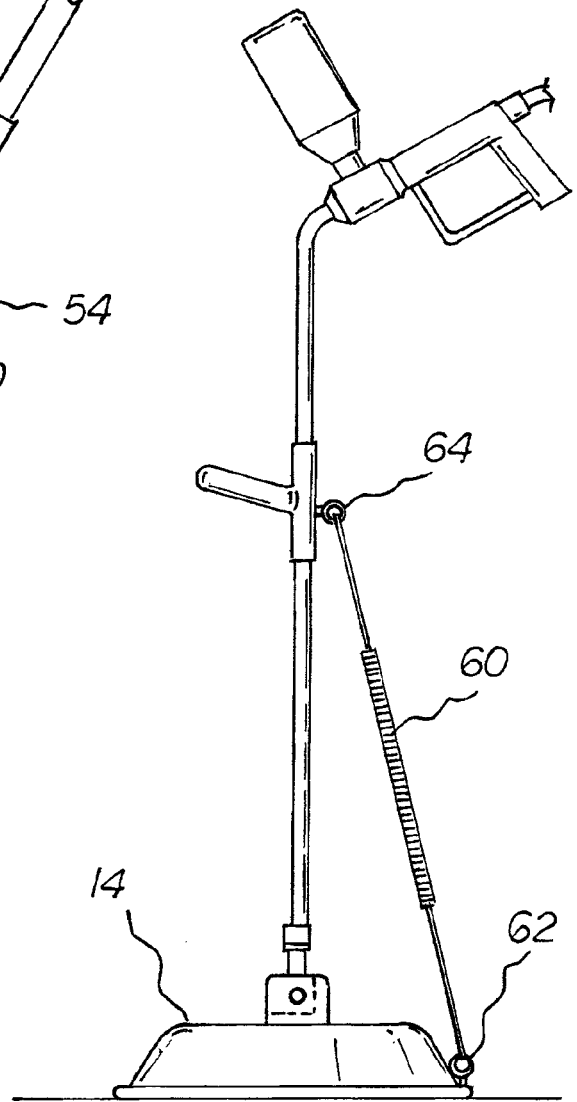
FIG. 4 is a side elevational view of the system in a rest position.
Figure 5:
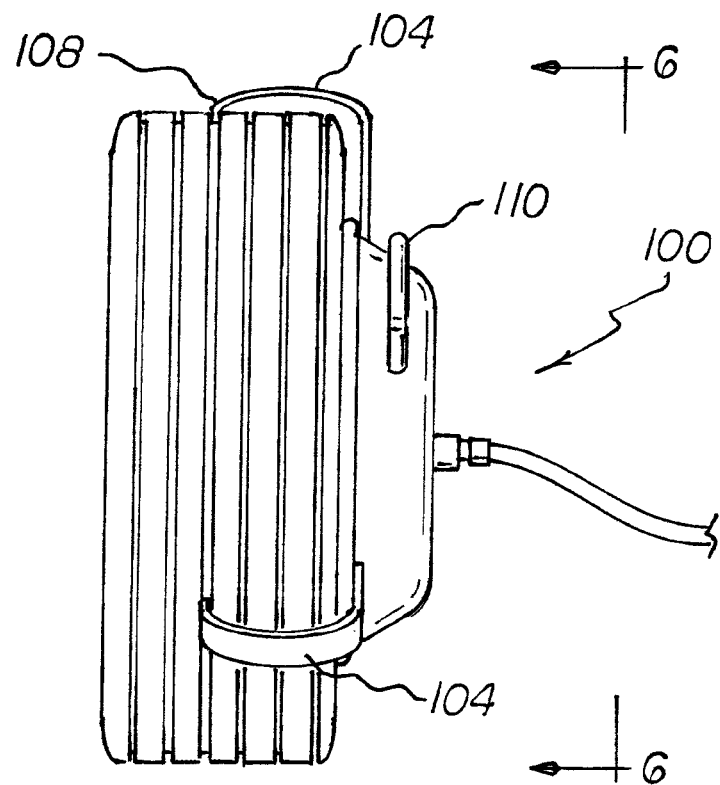
FIG. 5 is a front elevational view of an alternate embodiment of the invention.
Figure 6:
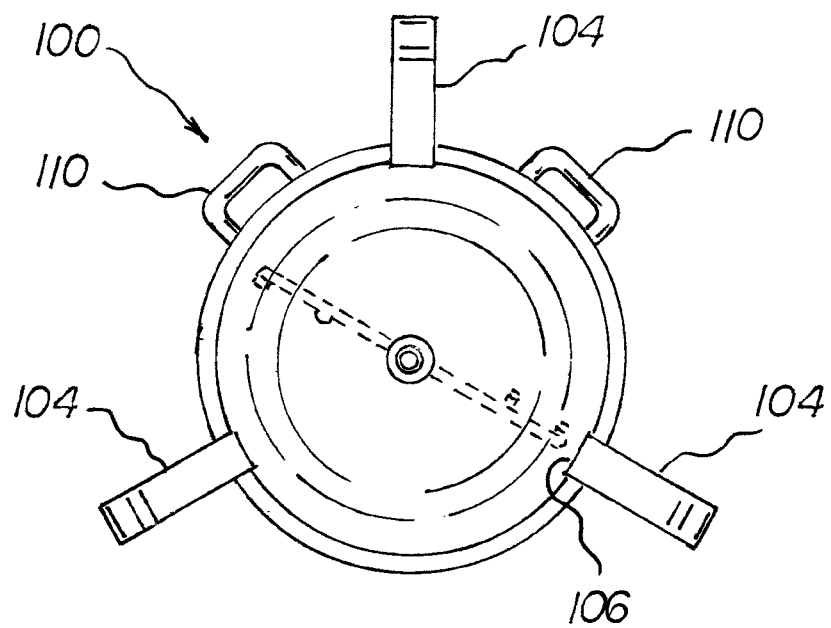
FIG. 6 is a side elevational view taken along line 6-6 of FIG. 5.

Provided last is a handling assembly. The handling assembly includes a grip 58. The grip is secured to the rigid segment intermediate the trigger and the bracket. The handling assembly also includes two coil springs 60. The coil springs have lower ends 62. The lower ends are attached to the housing beneath the bracket. The coil springs have upper ends 64. The upper ends are attached to the fixed segment beneath the grip. The springs are adapted to retract the housing to a rest position with the open end on a horizontal recipient surface. The springs are further adapted to retract the fixed segment perpendicular thereto during times of non-operation and non-use. Note FIG. 4.

An alternate embodiment 100 of the present invention is provided. A plurality of flexible straps 104 is provided. Each strap has a fixed end 106. The fixed end is coupled to the housing adjacent to the exterior end at circumferentially spaced locations. Each strap has a movable end 108. The movable end is removably coupled to a tire at its treads. In this manner the housing is secured adjacent to a wheel during operation and use. A pair of handles 110 is provided. The handles are provided on the housing. In this manner positioning the housing with respect to the wheel to be cleaned is facilitated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel cleaning system comprising:
   a housing having interior and exterior ends with a side wall there between; and
   a spray assembly including a manifold mounted within the housing, a tube extending through the exterior end coupling the manifold to a source of water, a plurality of spray nozzles on the manifold angled in opposite directions whereby pressurized water passing through the tube will discharge the water coming into contact with a wheel there adjacent; and
   a circular screen having a center attached to the manifold during operation and use, the screen being formed of a plurality of concentric wire rings with wires radially coupling the rings.

2. The system as set forth in claim 1 and further including:
a water supply assembly having an input end adapted to be coupled to a source of water, the water supply assembly having an output end attached to the tube, a handle with a trigger at an intermediate region of the water supply assembly, the trigger adapted to be pulled to allow the flow of water from the source to and through the nozzles and to exterior of the housing, the water supply assembly having a rigid segment downstream of the trigger and a flexible segment upstream of the trigger, a bracket fixedly secured to the housing adjacent to the tube and pivotally secured to the fixed segment whereby the fixed tube is movable between first orientation co-axial with the fixed tube and a second orientation perpendicular to the fixed tube and any intermediate angular orientation there between.

3. The system as set forth in claim 2 and further including:
a handling assembly including a grip secured to the rigid segment intermediate the trigger and the bracket, the handling assembly also including a coil spring with a lower end attached to the housing beneath the bracket, the coil spring having an upper end attached to the fixed segment beneath the grip, the spring adapted to retract the housing to a rest position with the open end on a horizontal recipient surface and the fixed segment perpendicular to the recipient surface during times of non-operation and non-use.

4. The system as set forth in claim 1 wherein the manifold is mounted for rotational movement within the housing.

5. The system as set forth in claim 1 wherein the manifold is fixedly mounted within the housing.

6. The system (100) as set forth in claim 1 and further including:
a plurality of flexible straps (104), each strap having a fixed end (106) coupled to the housing adjacent to the exterior end at circumferentially spaced locations, each strap having a movable end (108) removably coupled to a tire at its treads for securing the housing adjacent to a wheel during operation and use, a pair of handles (110) on the housing to facilitate positioning the housing with respect to the wheel to be cleaned.

7. A portable wheel cleaning system (10) for spraying pressurized water onto a wheel to be cleaned and for rotating the sprayed pressurized water in order to remove dirt and debris from the sprayed wheel, the spraying and rotating and removing being done in a safe, convenient and economical manner, the system comprising, in combination:
a housing (14) having a circular interior end (18) of a first diameter, the housing having a circular exterior end (20) of a second diameter, the second diameter being from 60 percent to 80 percent of the first diameter, the housing having a frusto-conical side wall (22) between the interior end and exterior end, a normally horizontal central axis extending centrally through the interior end and the exterior end and the side wall, the interior end and the exterior end being in parallel planes perpendicular with the central axis, the side wall forming an angle of between 20 degrees and 40 degrees with respect to the central axis, the interior end being open, the side wall being imperforate, the interior end being formed as an extension of the side wall with a central aperture (24), the housing being fabricated of a rigid metallic material;
a spray assembly (28), the spray assembly including a manifold positioned within the housing and mounted for rotational movement about a plane parallel with, and intermediate of, the interior end and exterior end, the manifold being linear with a length less than the first diameter and greater than the second diameter, a fixed tube (30) extending through the central aperture, the fixed tube having an exterior end exterior of the housing and an interior end within the housing, a rotatable tube (32) coupling the fixed tube and a central extent of the manifold, the rotatable tube being rotatable with respect to the interior end of the fixed tube, a plurality of spray nozzles (34) on the manifold on opposite sides of the rotatable tube, the spray nozzles on a first side of the rotatable tube being angled in a first direction, the spray nozzles on a second side of the rotatable tube being angled in a second direction whereby pressurized water passing through the fixed tube and rotatable tube and manifold and nozzles will spin the nozzles and discharge the pressurized water through the interior end into contact with a wheel there adjacent;
a circular screen (38) having a center attached to the rotatable tube for rotation therewith during operation and use, the screen being formed of a plurality of wire rings with wire radii coupling the rings, the screen adapted to preclude damaging contact between the rotating nozzles and the wheel there adjacent being cleaned;
a water supply assembly having an input end (42) adapted to be coupled to a source of pressurized water, the water supply assembly having an output end (44) attached to the fixed tube, a handle with a trigger (46) at an intermediate region of the water supply assembly, the trigger adapted to be pulled to allow the flow of water from the source to and through the nozzles and to exterior of the housing, the water supply assembly having a rigid segment (48) downstream of the trigger and a flexible segment (50) upstream of the trigger, a supply (52) of a cleaning fluid in the rigid segment adjacent to the trigger, a bracket (54) fixedly secured to the housing adjacent to the fixed tube and pivotally secured to the fixed segment whereby the fixed tube is movable between first orientation co-axial with the fixed tube and a second orientation perpendicular to the fixed tube and any intermediate angular orientation there between; and
a handling assembly including a grip (58) secured to the rigid segment intermediate the trigger and the bracket, the handling assembly also including two coil springs (60) with lower ends (62) attached to the housing beneath the bracket, the coil springs having upper ends (64) attached to the fixed segment beneath the grip, the springs adapted to retract the housing to a rest position with the open end on a horizontal recipient surface and the fixed segment perpendicular thereto during times of non-operation and non-use.

\* \* \* \* \*